(12) United States Patent
Blanton et al.

(10) Patent No.: US 10,532,825 B2
(45) Date of Patent: Jan. 14, 2020

(54) SENSOR-BASED GUIDANCE FOR ROTORCRAFT

(71) Applicant: The Boeing Company, Chicago, IL (US)

(72) Inventors: Brendan Blanton, Wilmington, DE (US); Deanna Dibernardi, Newtown Square, PA (US); Robert Allen, Glen Mills, PA (US); Katherine Gresko, Abington, PA (US); Timothy Paul, Gilbertsville, PA (US); Joseph Kenney, Media, PA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/973,228

(22) Filed: May 7, 2018

(65) Prior Publication Data

US 2019/0337641 A1 Nov. 7, 2019

(51) Int. Cl.
| | |
|---|---|
| *B64F 1/20* | (2006.01) |
| *G08G 5/00* | (2006.01) |
| *B64D 1/22* | (2006.01) |
| *B64D 47/08* | (2006.01) |
| *B64C 27/06* | (2006.01) |
| *G06K 9/00* | (2006.01) |

(52) U.S. Cl.
CPC ................. *B64F 1/20* (2013.01); *B64C 27/06* (2013.01); *B64D 1/22* (2013.01); *B64D 47/08* (2013.01); *G06K 9/0063* (2013.01); *G08G 5/0047* (2013.01)

(58) Field of Classification Search
CPC ..................................... B64F 1/20; B64F 1/18
See application file for complete search history.

(56) References Cited

U.S. PATENT DOCUMENTS

| | | | |
|---|---|---|---|
| 7,679,528 B1 | 3/2010 | Etherington et al. | |
| 8,643,850 B1 * | 2/2014 | Hartman | G01S 5/163 342/29 |
| 9,223,008 B1 * | 12/2015 | Hartman | G01S 5/163 |
| 10,176,722 B1 * | 1/2019 | Boyd | G08G 5/025 |

(Continued)

OTHER PUBLICATIONS https://www.youtube.com/watch?v=HPheWEOc0e8 accessed May 7, 2018.

(Continued)

*Primary Examiner* — Rebecca A Volentine
(74) *Attorney, Agent, or Firm* — Kunzler Bean & Adamson

(57) ABSTRACT

Disclosed herein is a method that comprises acquiring one or more images of a plurality of markers of an off-board target using a camera onboard a rotorcraft, the plurality of markers arranged in a predefined pattern. The method also comprises processing, using an image processor, the one or more images of the plurality of markers to identify the predefined pattern of the plurality of markers. The method further comprises determining guidance information for the rotorcraft relative to the off-board target based on the identified predefined pattern of the plurality of markers, an orientation of the plurality of markers and a relative spacing of the plurality of markers. The method additionally comprises providing the determined guidance information to a display device within a field of view of an operator of the rotorcraft.

22 Claims, 6 Drawing Sheets

(56) References Cited

U.S. PATENT DOCUMENTS

| | | | |
|---|---|---|---|
| 2010/0039294 A1* | 2/2010 | Feyereisen | G06K 9/0063 |
| | | | 340/972 |
| 2011/0121997 A1* | 5/2011 | Paines | B64F 1/20 |
| | | | 340/945 |
| 2011/0192932 A1 | 8/2011 | Brenner et al. | |
| 2012/0007979 A1 | 1/2012 | Schneider et al. | |
| 2014/0336848 A1* | 11/2014 | Saund | G08G 1/054 |
| | | | 701/3 |
| 2015/0232198 A1 | 8/2015 | Seibt | |
| 2016/0009393 A1 | 1/2016 | Repp et al. | |
| 2016/0306363 A1* | 10/2016 | Wang | G01C 21/005 |
| 2017/0045894 A1* | 2/2017 | Canoy | G05D 1/0676 |
| 2017/0160712 A1* | 6/2017 | Yun | G05B 19/042 |
| 2017/0278403 A1* | 9/2017 | Pitcher | G01S 17/933 |
| 2017/0291707 A1 | 10/2017 | Veronesi et al. | |
| 2018/0159303 A1 | 6/2018 | Kim | |
| 2018/0293902 A1 | 10/2018 | Lieberman et al. | |

OTHER PUBLICATIONS https://www.youtube.com/watch?v=FgPMcJUuO8g accessed May 7, 2018.

Pradana, Design and Implementation of Visible Light Communication System Using Pulse Width Modulation, The 5th International Conference on Electrical Engineering and Informatics, Aug. 10, 2015, pp. 25-30, Ball Indonesia.

\* cited by examiner

SENSOR-BASED GUIDANCE FOR ROTORCRAFT

FIELD

This disclosure relates generally to rotorcraft guidance systems, and more particularly to using sensor data to provide guidance information to a rotorcraft operator.

BACKGROUND

Communications between an aircrew and a ground crew often involves the use of radios and/or hand signals (aircraft marshalling) to guide a rotorcraft such as a helicopter to a desired location. Under certain situations, radio communication is not effective due to the noisy environment that the rotorcraft generates and hand signals may be confused or misinterpreted. Furthermore, a rotorcraft operator may not have constant and clear visibility of a payload and/or with a ground crew member who is providing hand signals.

SUMMARY

The subject matter of the present application has been developed in response to the present state of the art, and in particular, in response to the problems and disadvantages associated with conventional systems for providing ground-to-air guidance information. Accordingly, the subject matter of the present application has been developed to provide ground-to-air guidance information that overcomes at least some of the above-discussed shortcomings of prior art techniques.

Disclosed herein is a method that comprises acquiring one or more images of a plurality of markers of an off-board target using a camera onboard a rotorcraft, the plurality of markers arranged in a predefined pattern. The method also comprises processing, using an image processor, the one or more images of the plurality of markers to identify the predefined pattern of the plurality of markers. The method further comprises determining guidance information for the rotorcraft relative to the off-board target based on the identified predefined pattern of the plurality of markers, an orientation of the plurality of markers and a relative spacing of the plurality of markers. The method additionally comprises providing the determined guidance information to a display device within a field of view of an operator of the rotorcraft. The preceding subject matter of this paragraph characterizes example 1 of the present disclosure.

At least one marker of the plurality of markers comprises a pattern indicator marker, which has different characteristics than the other markers and is used for determining the predefined pattern of the plurality of markers. The preceding subject matter of this paragraph characterizes example 2 of the present disclosure, wherein example 2 also includes the subject matter according to example 1, above.

The characteristics of the plurality of markers comprises one of a wireless signal, a color, a frequency of a wireless signal, a pulse, and a shape. The preceding subject matter of this paragraph characterizes example 3 of the present disclosure, wherein example 3 also includes the subject matter according to example 2, above.

The plurality of markers comprises beacons that propagate wireless signals, which comprise one or more of ultraviolet light, visible light, infrared light, and short wave infrared light. The preceding subject matter of this paragraph characterizes example 4 of the present disclosure, wherein example 4 also includes the subject matter according to any one of examples 1-3, above.

At least one marker of the plurality of markers comprises a beacon array. The beacon array comprises a plurality of beacons in a single unit for propagating information describing one or more of the predefined pattern of the plurality of markers, distances between the plurality of markers, and a total number of the plurality of markers. The preceding subject matter of this paragraph characterizes example 5 of the present disclosure, wherein example 5 also includes the subject matter according to any one of examples 1-4, above.

The guidance information comprises one or more of range and directional pose information related to the position of the off-board target relative to the rotorcraft based on relative spacing and orientation of the plurality of markers. The preceding subject matter of this paragraph characterizes example 6 of the present disclosure, wherein example 6 also includes the subject matter according to any one of examples 1-5, above.

The guidance information comprises an output graphic of the plurality of markers overlaid on an image of the off-board target on the display. The preceding subject matter of this paragraph characterizes example 7 of the present disclosure, wherein example 7 also includes the subject matter according to any one of examples 1-6, above.

The method further comprises providing the guidance information to the operator of the rotorcraft as audio information. The preceding subject matter of this paragraph characterizes example 8 of the present disclosure, wherein example 8 also includes the subject matter according to any one of examples 1-7, above.

The plurality of markers comprises at least three markers arranged in the predefined pattern. The preceding subject matter of this paragraph characterizes example 9 of the present disclosure, wherein example 9 also includes the subject matter according to any one of examples 1-8, above.

The off-board target comprises an item intended to be picked-up by the rotorcraft as a sling load. The plurality of markers are arranged in the predefined pattern on a top surface of the item. The preceding subject matter of this paragraph characterizes example 10 of the present disclosure, wherein example 10 also includes the subject matter according to any one of examples 1-9, above.

The off-board target comprises a landing site for the rotorcraft. The plurality of markers are arranged in the predefined pattern around the landing site. The preceding subject matter of this paragraph characterizes example 11 of the present disclosure, wherein example 11 also includes the subject matter according to any one of examples 1-10, above.

The camera is located on a bottom side of the rotorcraft and comprises a wide-angle lens. The preceding subject matter of this paragraph characterizes example 12 of the present disclosure, wherein example 12 also includes the subject matter according to any one of examples 1-11, above.

Further disclosed herein is a system that comprises a rotorcraft and a camera onboard the rotorcraft. The system further comprises an image processor for processing images that the camera acquires. The system additionally comprises a plurality of markers of an off-board target. The plurality of markers are arranged in a predefined pattern. The system also comprises a controller that is configured to acquire one or more images of the plurality of markers using the camera. The controller is also configured to process, using the image processor, the one or more images of the plurality of markers to identify the predefined pattern of the plurality of markers. The controller is further configured to determine guidance information for the rotorcraft relative to the off-board target based on the identified predefined pattern of the plurality of markers, an orientation of the plurality of markers and a relative spacing of the plurality of markers. The controller is additionally configured to provide the determined guidance information to a display device within a field of view of an operator of the rotorcraft. The preceding subject matter of this paragraph characterizes example 13 of the present disclosure.

At least one marker of the plurality of markers comprises a pattern indicator marker. The pattern indicator marker has different characteristics than the other markers and is used for determining the predefined pattern of the plurality of markers, the characteristics of the plurality of markers comprising one of a wireless signal, a color, a frequency of a wireless signal, a pulse, and a shape. The preceding subject matter of this paragraph characterizes example 14 of the present disclosure, wherein example 14 also includes the subject matter according to example 13, above.

The plurality of markers comprises beacons that propagate wireless signals. The wireless signals comprise one or more of ultraviolet light, visible light, infrared light, and short wave infrared light. The preceding subject matter of this paragraph characterizes example 15 of the present disclosure, wherein example 15 also includes the subject matter according to any one of examples 13-14, above.

At least one marker of the plurality of markers comprises a beacon array. The beacon array comprises a plurality of beacons in a single unit for propagating information describing one or more of the predefined pattern of the plurality of markers, distances between the plurality of markers, and a total number of the plurality of markers. The preceding subject matter of this paragraph characterizes example 16 of the present disclosure, wherein example 16 also includes the subject matter according to any one of examples 13-15, above.

The guidance information comprises one or more of range and directional pose information related to the position of the off-board target relative to the rotorcraft based on relative spacing and orientation of the plurality of markers. The preceding subject matter of this paragraph characterizes example 17 of the present disclosure, wherein example 17 also includes the subject matter according to any one of examples 13-16, above.

The guidance information comprises an output graphic of the plurality of markers overlaid on an image of the off-board target on the display. The preceding subject matter of this paragraph characterizes example 18 of the present disclosure, wherein example 18 also includes the subject matter according to any one of examples 13-17, above.

The plurality of markers comprises at least three markers arranged in the predefined pattern. The preceding subject matter of this paragraph characterizes example 19 of the present disclosure, wherein example 19 also includes the subject matter according to any one of examples 13-18, above.

Also disclosed herein is an apparatus that comprises an image capturing module configured to acquire one or more images of a plurality of markers of an off-board target using a camera onboard a rotorcraft. The plurality of markers are arranged in a predefined pattern. The apparatus also comprises an image processing module configured to process, using an image processor, the one or more images of the plurality of markers to identify the predefined pattern of the plurality of markers. The apparatus further comprises a guidance module configured to determine guidance information for the rotorcraft relative to the off-board target based on the identified predefined pattern of the plurality of markers, an orientation of the plurality of markers and a relative spacing of the plurality of markers. The apparatus additionally comprises a presentation module configured to provide the determined guidance information to a display device in the field of view of an operator of the rotorcraft. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1A:
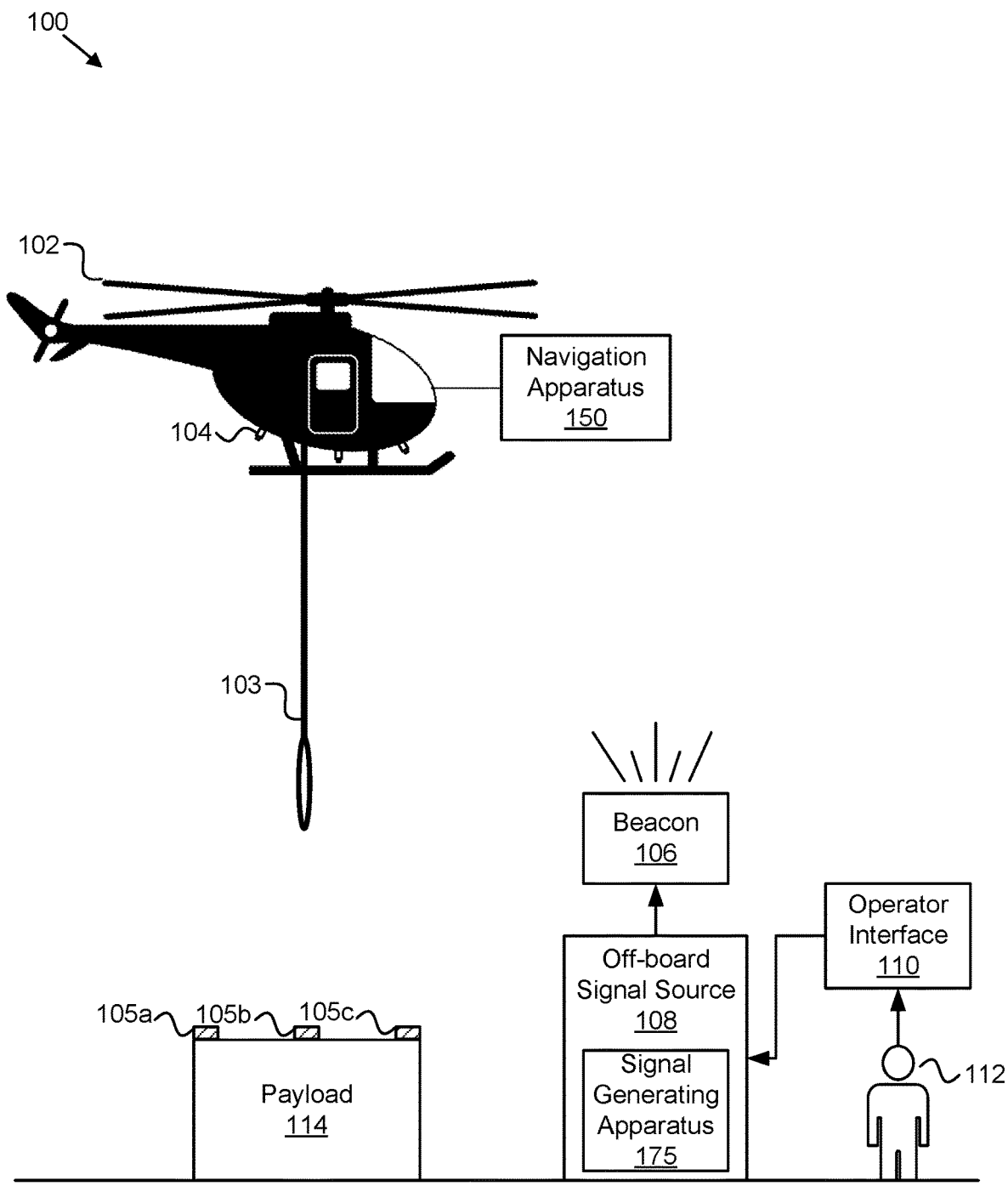
FIG. 1A is a schematic block diagram of a system for sensor-based guidance for rotorcraft, according to one or more examples of the present disclosure.

FIG. 1 is a schematic block diagram illustrating one embodiment of a system 100 for sensor-based guidance for rotorcraft. The system 100, in one embodiment, includes a rotorcraft 102. As used herein, a rotorcraft 102 is a heavier-than-air flying machine that uses lift generated by wings, called rotary wings or rotor blades that revolve around a mast. Several rotor blades mounted on a single mast are referred to as a rotor. Rotorcraft include aircraft where one or more rotors are required to provide lift, e.g., helicopters, tiltrotor aircraft, cyclocopters, autogyros, and gyrodynes. Some rotorcraft also include additional thrust engines or propellers. In certain embodiments, the rotorcraft 102 includes a cargo hook 103 that is suspended below the rotorcraft 102 and allows the transport of external loads during flight, e.g., such as payload 114.

In one embodiment, the system 100 includes one or more camera devices 104 that are mounted onboard the rotorcraft 102. In certain embodiments, the camera devices 104 are mounted onboard the rotorcraft 102 in such a way as to capture data, e.g., images, from the ground, from other aircraft in close proximity to the rotorcraft 102, and/or the like. For example, the rotorcraft 102 may include a camera 104 that is mounted to the belly of the rotorcraft 102 to capture images of objects on the ground that may not be visible to the rotorcraft operator.

The camera devices 104, in various embodiments, include digital cameras or video cameras that are configured to capture image data transmitted using a signal bandwidth that includes ultraviolet light, visible light, or infrared light (e.g., long wave or short wave infrared light). In one embodiment, the camera device 104 includes a wide angle lens, or other similar lens for capturing a wide view of a scene. In certain embodiments, the rotorcraft 102 may include one camera 104 or multiple cameras 104 onboard its body for capturing images.

In certain embodiments, the system 100 includes a plurality of markers 105a-c (collectively 105). The markers 105, as used herein, comprise objects configured to be indicators, signs, symbols, and/or the like of different points along a surface. For instance, as depicted in FIG. 1, the plurality of markers may be placed along the top surface of a crate, e.g., payload 114, to indicate the boundaries of the top surface, e.g., the corners and/or edges of the top surface. The markers 105 can also be used to indicate the boundaries of landing sites, e.g., a landing site on a ship, or other objects of interest. The markers 105, for example, may be embodied as stickers, placards, signs, or other objects that can be attached or integrated into a payload 114 or landing site.

In various embodiments, the markers 105 are arranged in a predefined pattern, e.g., a geometric pattern such as a rectangle, a circle, a diamond, a triangle, a star, and/or the like. As explained in more detail below, the predefined pattern can be used to determine the "pose" of the object associated with the markers 104, e.g., the payload 114, relative to the rotorcraft. As used herein, the pose refers to an object's position, range, and orientation relative to the rotorcraft 102, which is difficult to determine when the object is not in the field of view of the rotorcraft operator, e.g., when the object is directly underneath the rotorcraft 102, when the object is not visible at night or in poor weather conditions, and/or the like. In certain embodiments, at least three markers 105 are necessary to create and identify a predefined pattern that indicates that pose of the payload 114 or landing site.

In one embodiment, the markers 105 comprise various visual characteristics such as a color, a shape, and/or the like. In various embodiments, the markers 105 have different propagation characteristics such as emitting wireless signals such as ultraviolet light, visible light, infrared light (e.g., long wave or short wave infrared light), and/or the like. In such an embodiment, the characteristics also include a frequency or bandwidth of the wireless signal, a pulse rate of the wireless signal, and/or the like. In one embodiment, the markers 105 include beacons 106, described below.

In certain embodiments, at least one of the markers 105 is designated as a marker 106 that indicates the pattern or geometry of the plurality of markers 105. The pattern indicator marker may have different characteristics than the other markers 105 of the plurality of markers. For instance, the pattern indicator marker may have a different color, shape, wireless signal type/bandwidth/frequency/pulse rate, and/or the like. As described in more detail below, the navigation apparatus 150 uses the pattern indicator marker as a starting point to determine the predefined arrangement pattern/geometry of the plurality of markers 105.

Figure 4:
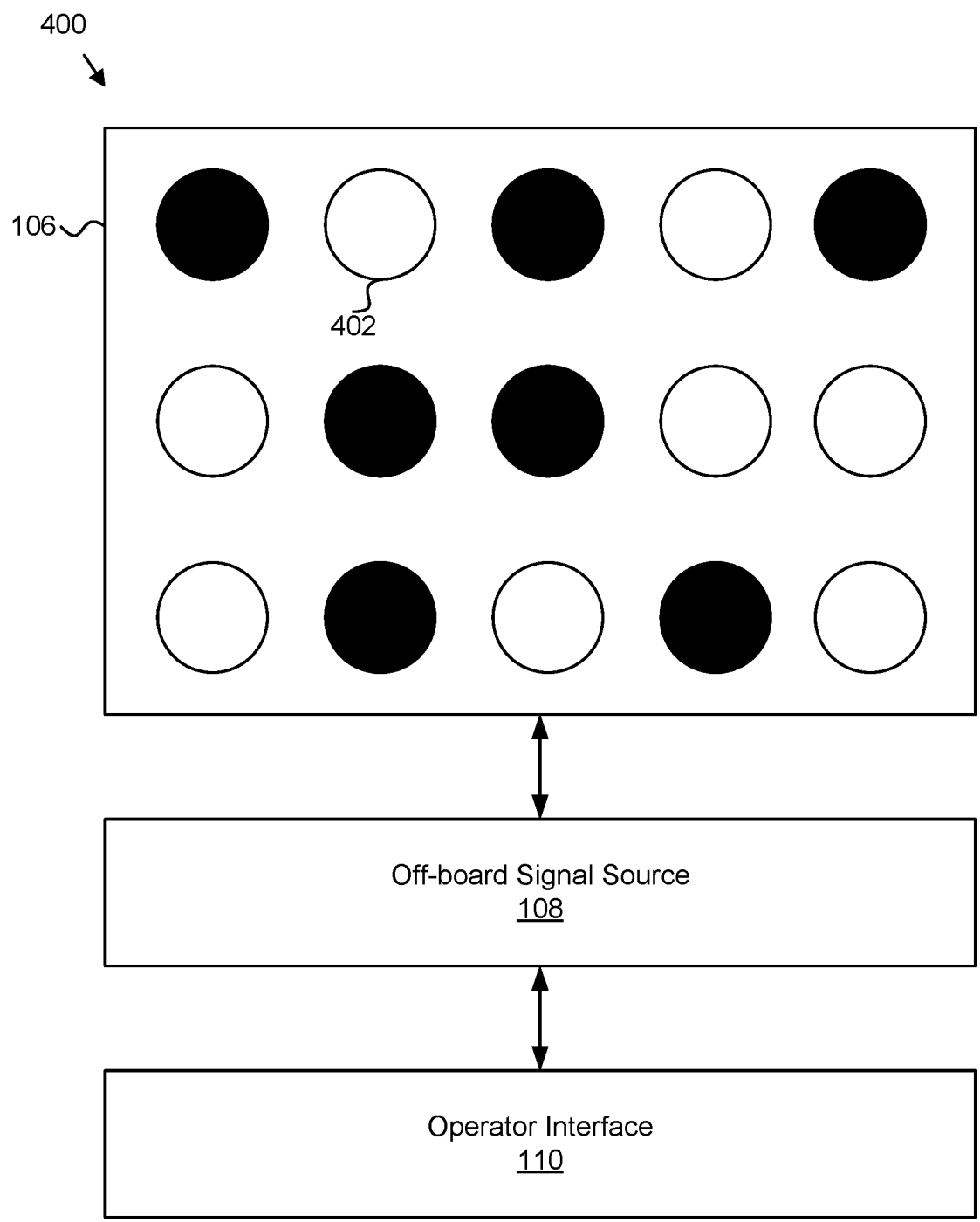
FIG. 4 is a schematic block diagram of a beacon array for sensor-based guidance for rotorcraft, according to one or more examples of the present disclosure.

In certain embodiments, a marker 105 of the plurality of markers is embodied as a beacon array, e.g., a plurality of beacons 106 in a single unit as illustrated in FIG. 4. In such an embodiment, more information may be propagated, displayed, presented, and/or the like in a single image that the camera 104 captures. For instance, the beacon array may display a beacon pattern that describes or defines the predefined pattern that the markers 105 are arranged in, the distances between the markers 105, the total number of markers 105, the frequencies or bandwidths being propagated by the markers 105, and/or the like. The beacon array may alternatively be embodied as a device separate from the markers 105. The characteristics of a beacon array is described in more detail below.

In one embodiment, the system 100 includes a beacon 106 that is configured to generate (e.g., present, display, emit, and/or the like) visual coded signals provided by a user 112 associated with the beacon 106. For instance, the beacon 106 may comprise, or otherwise be part of, an array of a plurality of beacons 106, such as an array of light emitting diodes (LEDs), that are selectively activated (see, e.g., activated beacon 402) to provide a visual representation of a command, message, code, and/or the like that the user 112 provides, which is described in more detail below with reference to FIG. 4.

In one embodiment, the beacon 106 may be placed at a stationary location on the ground so that it is visible to the camera 104 mounted onboard the rotorcraft 102. In other embodiments, the beacon 106 may be mounted on a user 112, e.g., on a user's helmet or shoulder, on a different aircraft, on a ground-based vehicle, on a payload 114, on a landing site, and/or the like as long as the beacon 106 is within the field of view of one or more cameras 104 mounted on board the rotorcraft 102.

In one embodiment, one or more beacons 106 are communicatively coupled to an off-board signal source 108. For instance, a beacon 106 may be connected to the off-board signal source 108 over a data network (e.g., a wired or wireless computer network). In certain embodiments, a beacon 106 is integrated into the off-board signal source 108 so that the beacon 106 and off-board signal source 108 are a single unit.

In one embodiment, the off-board signal source 108 is a computing device such as a desktop computer, a laptop computer, a tablet computer, a smart phone, a smart watch, a fitness band or other wearable activity tracking device, an optical head-mounted display (e.g., a virtual reality headset, smart glasses, or the like), a High-Definition Multimedia Interface ("HDMI") or other electronic display dongle, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In one embodiment, the off-board signal source 108 includes an instance of a signal generating apparatus 175. The signal generating apparatus 175, in certain embodiments, is configured to receive a command, message, signal, code, and/or the like from the operator interface 110. The command, message, signal, code, and/or the like may be provided to the operator interface 110 by the user 112, and may comprise ground-to-air information (e.g., direction information, guidance information, navigation information, schedule information, map information, directional pose information indicated by a plurality of markers 105, range information, orientation information, and/or the like) intended for the rotorcraft operator to use to maneuver the rotorcraft 102.

The operator interface 110, in one embodiment, is embodied as a computer device such as a desktop computer, a laptop computer, a tablet computer, a smart phone, a smart watch, a fitness band or other wearable activity tracking device, an optical head-mounted display (e.g., a virtual reality headset, smart glasses, or the like), a High-Definition Multimedia Interface ("HDMI") or other electronic display dongle, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

The operator interface 110 may include an interface for receiving user input and various input mechanisms such as a touch screen or other touch-enabled display, a keyboard, a stylus, a mouse, a microphone for receiving voice input, and/or the like. The operator interface 110, in certain embodiments, is communicatively connected to the off-board signal source 108 over a data network, e.g., a wired or wireless computer network. In certain embodiments, the operator interface 110 is integrated into the off-board signal source 108 such that the operator interface 110 and the off-board signal source 108 are a single unit.

In further embodiments, the signal generating apparatus 175 is configured to generate a code that represents the command, directional pose information, or the like, e.g., encode the command into a format that the beacon 106 can read and display. The signal generating apparatus 175, in various embodiments, is configured to present the encoded command or pose information on the beacon 106 so that it can be viewed and captured by the camera 104 on the rotorcraft 102.

The rotorcraft 102, in one embodiment, includes an instance of a navigation apparatus 150. The navigation apparatus 150, in various embodiments, is configured to receive (e.g., acquire, capture, and/or the like) one or more images of a plurality of markers 105 of an off-board target, e.g., payload 114 using a camera 104 onboard a rotorcraft 102. In certain embodiments, the navigation apparatus 150 is configured to process, using an image processor 216, the one or more images of the plurality of markers 105 to identify a predefined pattern of the plurality of markers 105, determine guidance information for the rotorcraft 102 relative to the off-board target based on the identified predefined pattern of the plurality of markers 105, and provide the determined guidance information to an operator of the rotorcraft 102.

In one embodiment, the navigation apparatus 150 and the signal generating apparatus 175 provide improvements over conventional systems for providing guidance information to rotorcraft operators from the ground and/or from a different aircraft. For instance, in conventional systems, an aircrew, e.g., the crew in the rotorcraft 102, may communicate with a ground crew, e.g., one or more users 112 on the ground, with radios, aircraft marshalling, and/or the like to guide a rotorcraft 102 into a desired location for landing, payload 114 pickup, payload 114 drop off, and/or the like. Aircraft marshalling, as used herein, includes using hand signals to replace radio communications because rotorcraft 102 may be noisy and make it difficult for the radio communications to be clearly transmitted and received. Regardless, there may be situations where the rotorcraft operator does not have continuous clear vision of the aircraft marshaller, the desired location of the payload 114 or landing site, and/or the like due to operational and/or environmental circumstances. Furthermore, because conventional systems rely on ground crew providing hand signals to aircrew observers, who then relay this information to the rotorcraft operator, e.g., over an intercom, inherent risks are present in the form of confused commands, latent commands, and/or the like.

The navigation apparatus 150 and the signal generating apparatus 175, in one embodiment, overcome the shortcomings of conventional guidance systems for rotorcraft 102 by providing direct communication to the rotorcraft operator by way of a coded guidance signal propagated using various markers 105 such as beacons 106. An image of the markers 105 is captured, processed to determine the pattern of the markers 105, and presented to the rotorcraft operator to provide the rotorcraft operator with guidance information for picking up a payload 114 or landing the rotorcraft 102 at a landing site that may otherwise be out of the operator's field of view. Furthermore, the navigation apparatus 150 and the signal generating apparatus 175 reduce or eliminate errors or misinterpretations of guidance commands that the users 112 on the ground provide.

In various embodiments, the navigation apparatus 150 and/or the signal generating apparatus 175 may be embodied as a hardware appliance that can be installed or deployed on a computing device. In certain embodiments, the navigation apparatus 150 and/or the signal generating apparatus 175 may include a hardware device such as a secure hardware dongle or other hardware appliance device (e.g., a set-top box, a network appliance, or the like) that attaches to a computing device either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the navigation apparatus 150 and/or the signal generating apparatus 175 may include a power interface, a wired and/or wireless network interface, a graphical interface that attaches to a display, and/or a semiconductor integrated circuit device as described below, configured to perform the functions described herein with regard to the navigation apparatus 150 and/or the signal generating apparatus 175.

The navigation apparatus 150 and/or the signal generating apparatus 175, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the navigation apparatus 150 and/or the signal generating apparatus 175 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the navigation apparatus 150 and/or the signal generating apparatus 175.

The semiconductor integrated circuit device or other hardware appliance of the navigation apparatus 150 and/or the signal generating apparatus 175, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the navigation apparatus 150 and/or the signal generating apparatus 175 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

As mentioned above, the payload 114 may be the desired location for the rotorcraft 102. The payload 114 may be associated with various scenarios that require the rotorcraft 102 to hover such as sling load operations, hoist operations, medevac/police operations, firefighting operations, flood relief operations (e.g., sandbag placement), utility maintenance (e.g., power line inspection/repair/install), ski landings in rocky terrain/soft snow, landing hazard detection (e.g., slopes, rocks, holes, obstacles), inflight checks, and/or the like. These scenarios require communication between rotorcraft operators and other crew members (e.g., ground crew, hoist operators, or the like) to compensate for obstructed views, limited situational awareness, and/or the like. The navigation apparatus 150 and/or the signal generating apparatus 175 enhance the safety, efficiency, and performance of the operations being performed by using sensor data to receive accurate guidance, directional, navigational, or the like information for the rotorcraft operator 102 instead of relying on verbal commands or hand gestures that can be confused, erroneously interpreted, and/or the like.

Figure 1B:
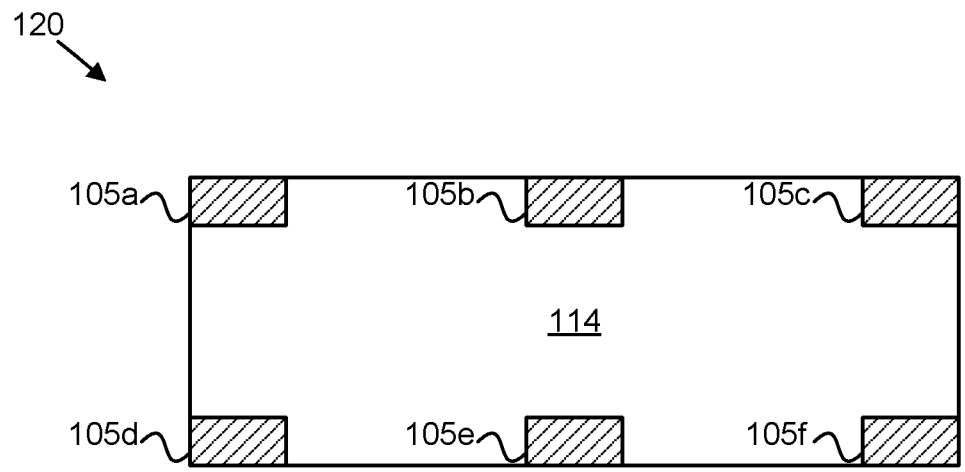
FIG. 1B is a schematic block diagram of one embodiment of an off-board target.

FIG. 1B depicts one embodiment 120 of an off-board target, e.g., payload 114 that includes a plurality of markers 105*a-f* (collectively 105) arranged in a predefined pattern on a top surface of the payload 114. In the depicted embodiment 120, the predefined pattern comprises a rectangular geometric shape generated based on the markers 105 located in the corners and edges of the top surface of the payload 114. The navigation apparatus 150, as described in more detail below, captures an image of the top surface of the payload 114 and processes the image to identify the markers 105 and determine the directional pose of the payload 114 relative to the rotorcraft 102. Based on the directional pose, guidance information can be provided to the rotorcraft operator for picking up the payload 114.

Figure 1C:
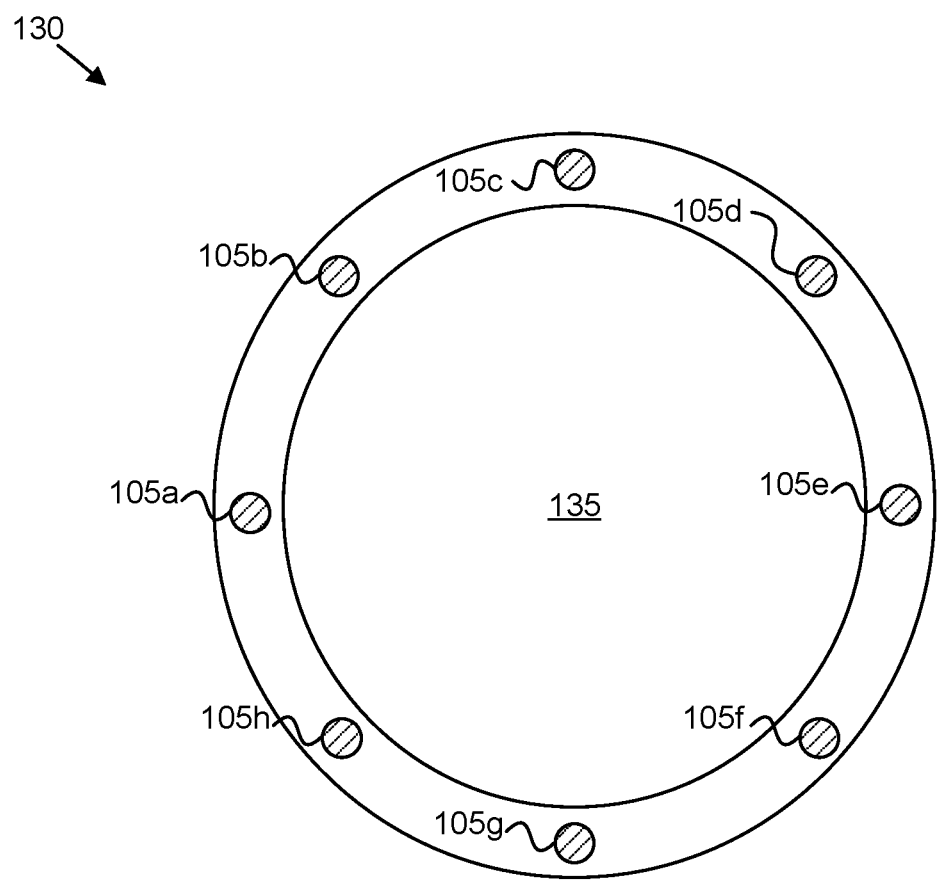
FIG. 1C is a schematic block diagram of another embodiment of an off-board target.

FIG. 1C depicts one embodiment 130 of an off-board target that comprises a landing site 135. In the depicted embodiment, the markers 105 are arranged in a circular fashion around the landing site 135. For instance, the markers 105 may comprise beacons 106 that are embedded into the landing site surface or that are mounted on the surface of the landing site 135. As with the markers 105 for the payload 114 described above with reference to FIG. 1B, the navigation apparatus 150 captures an image of the landing site 135, and processes the image to identify the markers 105 and determine the directional pose of the payload 114 relative to the rotorcraft 102. Based on the directional pose, guidance information can be provided to the rotorcraft operator for landing the rotorcraft 102 at the landing site 135.

Figure 2:
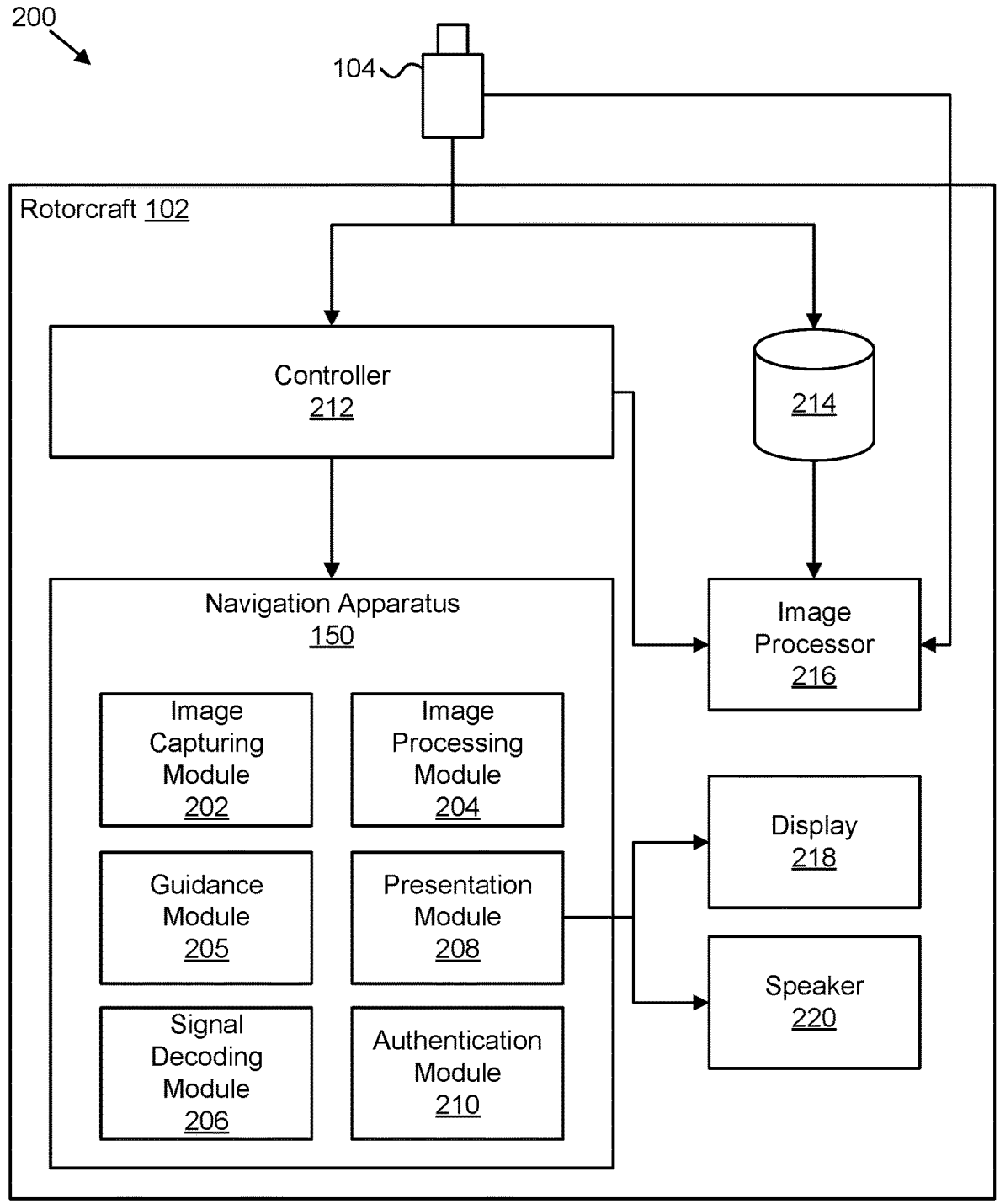
FIG. 2 is a schematic block diagram of a system for sensor-based guidance for rotorcraft, according to one or more examples of the present disclosure.

FIG. 2 depicts one embodiment of a system 200 for sensor-based guidance for rotorcraft. In one embodiment, the system 200 includes a rotorcraft 102, a camera 104 onboard the rotorcraft 102, as described above, a controller 212, a database 214, an image processor 216, a display 218, a speaker 220, and a navigation apparatus 150, which are described in more detail below.

The camera 104, as described above, is configured to capture one or more images of a coded signal propagated by a beacon 106 or beacon array, e.g., a beacon array pointed towards the direction of a hovering or flying helicopter. The controller 212 may control how the camera 104 operates, e.g., how often the camera 104 takes images, the resolution of the images, and/or other image capturing settings of the camera 104. The controller 212 may also manage transfer and storage of the captured images. For example, the controller 212 may transfer images that the camera 104 acquires to a database 214.

In one embodiment, the database 214 comprises a data store, a relational database, an image database, and/or the like that is configured to store images that the camera 104 captures. In certain embodiments, the database 214 stores images using non-volatile storage, e.g., a hard disk drive so that the images are persistently stored. In other embodiments, the database 214 stores images using volatile memory, e.g., RAM, so that the images are stored until power to the system 200 is shut off.

In one embodiment, the navigation apparatus 150 includes one or more of an image capturing module 202, an image processing module 204, a guidance module 205, a signal decoding module 206, a presentation module 208, and an authentication module 210, which are described in more detail below.

In certain embodiments, the image capturing module 202 is configured to capture or acquire one or more images of a plurality of markers 105 of an off-board target, e.g., a payload 114 or landing site, using the camera 104 that is mounted to the rotorcraft 102. As described above, the markers 105 are placed on the off-board target in a predefined pattern that indicates a directional pose, including the orientation, range, and/or the like of the rotorcraft 102 relative to the off-board target.

In one embodiment, the image capturing module 202 is configured to acquire one or more images of an off-board signal source 108 using the camera 104 that is onboard the rotorcraft 102. As described above, the off-board signal source 108 includes a beacon 106 or a beacon array that includes at least two beacons 106. In one embodiment, the image capturing module 202 is in communication with the controller 212 to acquire the one or more images of the beacon array.

For instance, the image capturing module 202 sends a signal, request, command, and/or the like to the controller 212 to instruct the controller 212 to capture an image with the camera 104. In some embodiments, the image capturing module 202 sends a signal, request, command, and/or the like to the controller 212 to instruct the controller 212 to retrieve an image, e.g., the most recently captured image from the database 214.

In one embodiment, the image processing module 204 is configured to process the one or more the one or more images of the plurality of markers 105 to identify the predefined pattern of the plurality of markers 105. For instance, the image processing module 204 may use an image processor 216, e.g., a processor that is dedicated, hard-wired, specially programmed, and/or the like for performing video and image processing such as a digital signal processor.

In certain embodiments, the image processing module 204 performs various image processing techniques, e.g., edge detection, or the like to identify the markers 105 within the captured images. In various embodiments, the image processing module 204 compares objects identified in the captured image to a database, data store, or the like of predefined markers 105 in order to identify the markers 105 in the image.

In some embodiments, the markers 105 comprise beacons 106 and the image processing module 204 is configured to identify the beacons 106 within the image. For instance, the camera 104 may include an infrared camera configured to capture images comprising short-wave infrared signals emitted from the beacons 106. The image processing module 206 may analyze the image to locate the beacons 106 in the image and identify the predefined pattern that the beacons 106 are arranged in, which provides the directional pose information for the off-board target associated with the beacons 106 relative to the rotorcraft 102.

In one embodiment, the image processing module 204 identifies a marker 105 of the plurality of markers 105 that is the pattern indicator marker. The pattern indicator marker, in certain embodiments, is the marker 105 that is used as the "first" marker 105 for determining the predefined pattern, geometry, or arrangement of the markers 105. In certain embodiments, the pattern indicator marker is identifiable because it has different characteristics than the other markers 105 such as a different color, shape, wireless signal frequency, wireless signal type, and/or the like. For example, the image processing module 204 may identify and start with the pattern indicator marker, and order the markers 105 in a clockwise or counter-clockwise manner by starting with the pattern indicator marker and moving to the next marker, and so on, until the predefined pattern or geometry is determined.

In one embodiment, the image processing module 204 is configured to process the one or more acquired images of the beacon 106 or beacon array to identify one or more coded signals, commands, messages, and/or the like that are propagated from the off-board signal source 108. For instance, in certain embodiments, the image processing module 204 may use an image processor 216 to analyze the acquired images and determine if there is are coded signals in the images.

For example, the image processor 216 may recognize in an image of a beacon array, which beacons 106 of the beacon array are active and the locations within the beacon array of the active beacons 106. The image processing module 204 may then determine whether the active beacons 106 of the beacon array correspond to a predetermined coded signal, command, message, and/or the like.

For instance, the beacon array may include information about the markers 105 such as the locations of the markers 105 on the surface of the off-board target, the distances between the markers 105, the orientation of the markers 105, the order of the markers 105, the colors/shapes of the markers 105, the frequency with which the markers 105 are transmitting wireless signals (e.g., if a marker 105 is a beacon), and/or the like. Based on the data from the beacon array, the image processing module 204 may identify the pattern or geometry of the markers 105 more quickly than attempting to identify the pattern on the fly.

The guidance module 205, in one embodiment, is configured to determine guidance information relative to the off-board target based on the identified predefined pattern of a plurality of markers 105, the orientation of the markers 105, the relative spacing of the markers 105, and/or the like. The guidance information, in various embodiments, includes directional pose information for the rotorcraft 102 relative to the off-board target. For instance, the directional pose information may include a range of the rotorcraft 102 to the off-board target, an orientation of the off-board target relative to the orientation of the rotorcraft 102, and/or the like. Thus, the guidance information may include navigation information (e.g., GPS information, directional information, etc.) for positioning the rotorcraft in a position to pick up a payload 114, land at a landing site 135, and/or the like.

In one embodiment, the guidance module 205 continuously monitors guidance information, e.g., pose information of a load while the rotorcraft 102 is carrying the load. For instance, the image capturing module 202 may continuously or at certain intervals capture images of a payload 114 being carried in a sling load by the rotorcraft 102 in flight using the camera 104 mounted to the rotorcraft 102. The image processing module 204 can then process the images to identify the markers 105 within the images that are located on the payload 114, and the guidance module 205 can provide up-to-date pose information for the payload 114 while the rotorcraft 102 carries the payload. The rotorcraft operator can use the guidance information, which the presentation module 208 provides to the rotorcraft operator as described below, to make in-flight adjustments for reducing stress on the rotorcraft 102 by adjusting for oscillations or other movements in the sling load that affect the control of the rotorcraft 102 while it carries the payload 114.

In certain embodiments, the guidance module 205 provides the determined guidance information to an aircraft flight control system, which may be an off-board flight control system that assists the rotorcraft operator with various rotorcraft operations such as hovering, landing, and/or the like. In such an embodiment, the guidance module 205 may be communicatively coupled to the aircraft flight control system over a data network, e.g., a wireless network such as a cellular communication network, a satellite communication network, and/or the like.

In one embodiment, the guidance module 205 is located on the rotorcraft 102, as depicted in FIG. 2. For instance, the guidance module 205 may comprise a portion of the navigation apparatus 150 that is located, stored, and/or the like on the rotorcraft 102 and is executable as part of a computing system or image processing system of the rotorcraft 102. In some embodiments, the guidance module 205 is located at a location that is remote from the rotorcraft 102. For example, the guidance module 205 may be located on a remote server that is accessible from the rotorcraft computing system over a data network, e.g., at a data center, at a central computing center, at the pickup/landing location, and/or the like. In such an embodiment, the guidance information may be determined at the remote server, which may be faster, more efficient, more powerful, or the like than the computing system on board the rotorcraft 102. Other modules of the navigation apparatus 150 may also be located on a computing device that is remote to the rotorcraft 102.

The signal decoding module 206, in one embodiment, is configured to decode the one or more coded signals, commands, messages, and/or the like to identify information for providing guidance to a rotorcraft operator. For example, the signal decoding module 206 may determine a direction, e.g., left, right, up, down, forward, back, etc., that corresponds to a coded signal.

In one embodiment, the signal decoding module 206 compares the image of the coded signal to one or more predefined images of coded signals to determine the corresponding information that the coded signal is associated with. For instance, the coded signal of an image of the beacon array depicted in FIG. 4 may correspond to a predefined coded signal for the "back" direction. The dark beacons of the array may represent inactive or unlit beacons and the light beacons may represent active or lit beacons. The predefined coded signals may be stored in the database 214 or other data store of the rotorcraft 102. Other information may include navigation information, e.g., GPS information, map information, schedule information, e.g., time for pick up at a particular location, and/or the like. For example, the coded signal of an image for the beacon array may indicate a GPS coordinate, a link to a map, a time, a location, and/or the like.

In one embodiment, the signal decoding module 206 decodes the one or more coded signals, commands, messages, and/or the like to determine information related to markers 105 located on the surface of an off-board target such as marker placement, marker orientation, distances between markers 105, frequencies with which the markers 105 are transmitting (e.g., if the markers 105 are beacons), and/or the like.

The presentation module 208, in one embodiment, is configured to provide the decoded guidance information to the rotorcraft operator in real-time. For instance, the presentation module 208 may display the guidance information on a device display 218, e.g., a computer device display, a heads-up display, and/or the like in a text format and/or a graphical format. For example, the presentation module 208 may display the word "left" if the guidance information instructs the operator to maneuver the rotorcraft 102 to the left. In another example, the presentation module 208 may present a graphical arrow or other symbol to indicate the "left" direction.

In further embodiments involving markers 105, the presentation module 208 may present an image of the off-board target with an overlay of the markers 105 and/or geometry/orientation of the pattern that the markers 105 are positioned to convey. The presentation module 208 can present additional information based on the directional pose of the off-board target relative to the rotorcraft 102 such as the distance or range to the off-board target, the orientation of the off-board target relative to the rotorcraft 102, navigational or directional information for positioning the rotorcraft with the off-board target, and/or the like.

In one embodiment, the presentation module 208 provides an audio version of the guidance information to the rotorcraft operator through one or more speakers 220, e.g., through a headset or other speaker proximate to the operator's location.

The authentication module 210, in one embodiment, is configured to authenticate an identity of the off-board signal source 108 prior to acquiring one or more images of the off-board signal source 108 using the camera 104. For instance, the authentication module 210 may perform one or more handshaking operations with the off-board signal source 108, over a short-range data network such as Bluetooth, near-field communication, and/or the like to verify the identity of the off-board signal source 108 and determine whether the off-board signal source 108 is an authorized device configured to provide guidance information for the rotorcraft 102.

Figure 3:
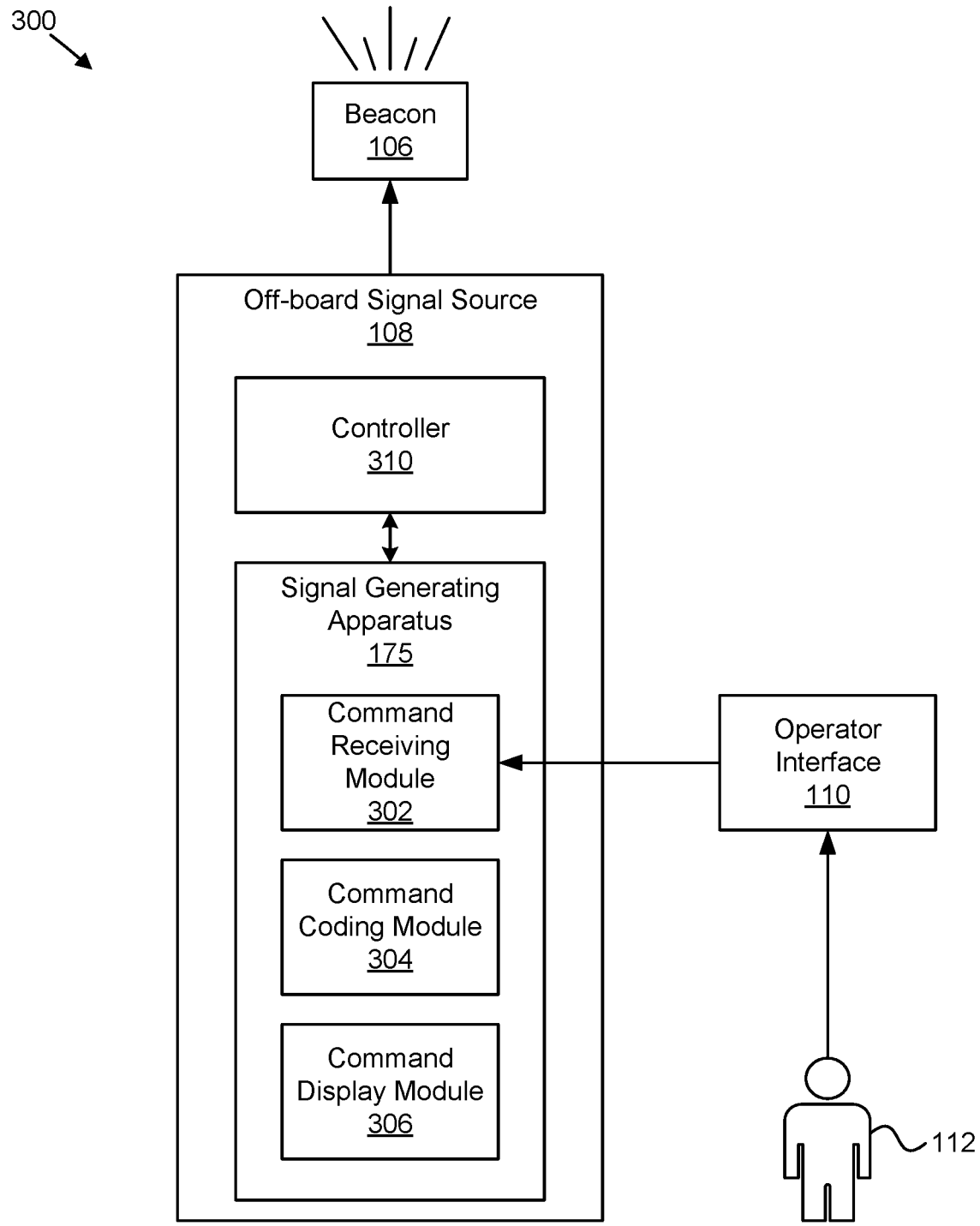
FIG. 3 is a schematic block diagram of a system for sensor-based guidance for rotorcraft, according to one or more examples of the present disclosure.

FIG. 3 depicts one embodiment of a system 300 for sensor-based guidance for rotorcraft. In one embodiment, the system 300 includes a beacon 106, or an array of beacons, an off-board signal source 108, an operator interface 110, and a user 112, which may be substantially similar to like-numbered elements depicted in FIG. 1. Furthermore, the off-board signal source 108, in certain embodiments, includes a controller 310, and a signal generating apparatus 175. The signal generating apparatus 175, in various embodiments, includes a command receiving module 302, a command coding module 304, and a command display module 306, which are described in more detail below.

The controller 310, in one embodiment, is configured to control the beacon 106, or each beacon 106 of a beacon array. For instance, the controller 310 may be configured to control individual beacons 106 of a beacon array by activating or deactivating particular beacons 106 of the beacon array in response to signals or triggers from the signal generating apparatus 175.

In one embodiment, the command receiving module 302 is configured to receive a guidance command, signal, message, and/or other guidance-related information from the operator interface 110 as entered by the user 112. For example, the guidance command may include a direction for the rotorcraft operator to maneuver the rotorcraft 102 such as "left," "right," "up," "down," "forward," "back," or the like. Other guidance commands may include GPS coordinates, map information, marker 105 positioning information (e.g., where the markers 105 are located, the number of markers 105, various characteristics of the markers 105, the geometry or pattern that the markers 105 are conveying, and/or the like), or the like for a location where user 112 wants the rotorcraft 102 to go, scheduling information for pickups or drop-offs, and/or the like.

The command coding module 304, in one embodiment, is configured to encode the received guidance command to a format that the beacon array can present to the rotorcraft 102, e.g., for the rotorcraft camera 104 to capture an image of the coded signal as presented on the beacon array. The command coding module 304, for instance, may check a predetermined list of guidance commands and their corresponding encodings to determine how to encode the guidance command that is received from the operator interface 110. In other embodiments, the command coding module 304 may encode the guidance command using a series of different encodings. For example, if the guidance command is a GPS coordinate, the command coding module 304 may encode the GPS coordinates as a series of coded signals, e.g., one for a latitude coordinate and one for a longitude coordinate, which the camera 104 takes a separate image of. In such an embodiment, each coded signal may include a reference number indicating its position in the series, e.g., 1 of 3, 2 of 3, etc.

The command display module 306, in one embodiment, is configured to present the coded guidance signals on the beacon 106 or beacon array for the camera 104 onboard the rotorcraft 102 to acquire an image of. For instance, the command display module 306 may send the coded signals to the controller 310, which activates the corresponding beacons 106 of the beacon array for the camera 104 to capture an image of.

FIG. 4 is a schematic block diagram of a beacon array 400 for sensor-based guidance for rotorcraft. In one embodiment, the beacon array 400 includes a plurality of beacons 106 that are selectively enabled/disabled, activated/deactivated, and/or the like. For example, the illustration depicted in FIG. 4 may be an encoded signal for the guidance command "up," to indicate to the rotorcraft to move in an upward direction, or an encoded signal for indicating a geometry of various markers 105 placed on the top surface of the payload 114. Accordingly, the controller 310 of the off-board signal source 108 may selectively activate and deactivate various beacons 106 of the beacon array 400 to achieve the desired pattern for the coded guidance command. The beacons 106 may be configured to emit or propagate a signal with a bandwidth that include ultraviolet light, visible light, infrared light, short-wave infrared light, and/or the like.

Figure 5:
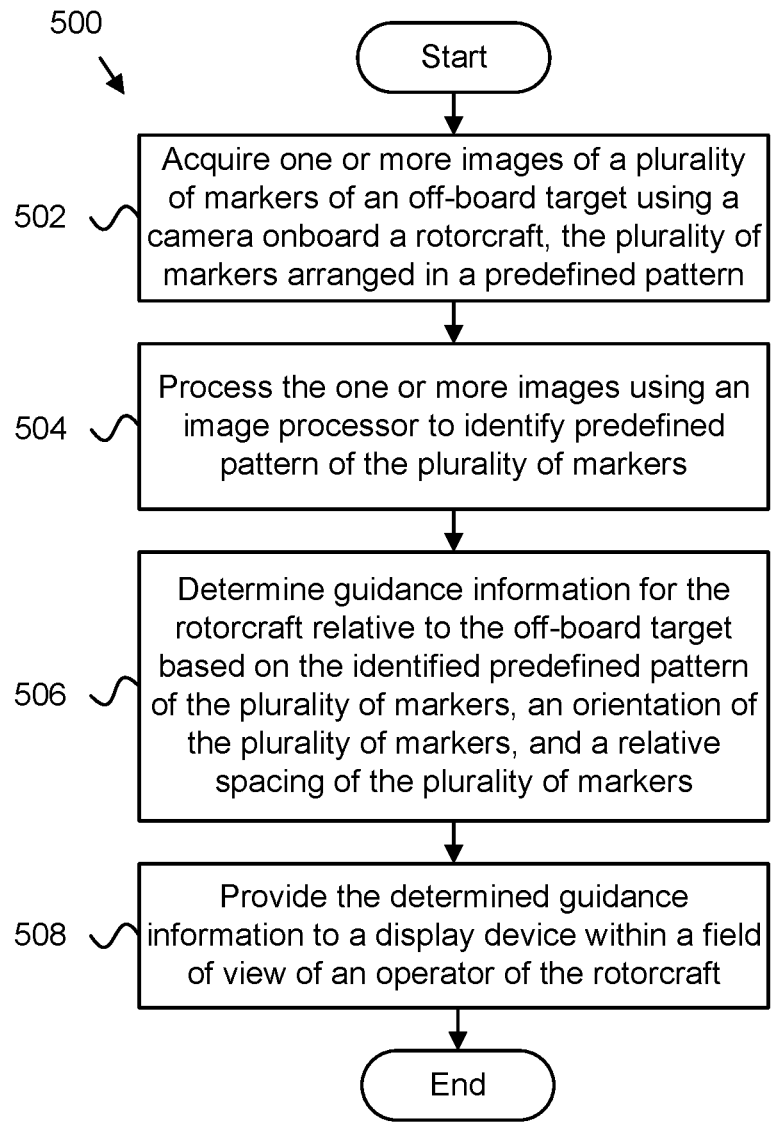
FIG. 5 is a schematic flow diagram of a method for sensor-based guidance for rotorcraft, according to one or more examples of the present disclosure.

FIG. 5 is a schematic flow diagram of a method 500 for sensor-based guidance for rotorcraft. In one embodiment, the method 500 begins and acquires 502 one or more images of a plurality of markers 105 of an off-board target using a camera 104 onboard a rotorcraft 102. In some embodiments, the plurality of markers 105 are arranged in a predefined pattern.

In various embodiments, the method 500 processes 504 the one or more images using an image processor 216 to identify the predefined pattern of the plurality of markers 105. In certain embodiments, the method 500 determines 506 guidance information for the rotorcraft 102 relative to the off-board target based on the identified predefined pattern of the plurality of markers 105, an orientation of the plurality of markers 105, and a relative spacing of the plurality of markers 105. In one embodiment, the method 500 provides 508 the determined guidance information to a display device within a field of view of an operator of the rotorcraft 102, and the method 500 ends.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Embodiments of the various modules may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The modules may be implemented as a hardware circuit comprising custom very-large-scale integration (VLSI) circuits or gate arrays, off-the-shelf semiconductors such as logic chips, transistors, or other discrete components. The modules may also be implemented in programmable hardware devices such as field programmable gate arrays, programmable array logic, programmable logic devices or the like.

The modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized by the modules. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method, comprising:
acquiring one or more images of a plurality of markers of an off-board target using a camera onboard a rotorcraft, the plurality of markers arranged in a predefined pattern, wherein at least one marker of the plurality of markers comprises a pattern indicator marker that is part of the predefined pattern of the plurality of markers and indicates a starting point for identifying the predefined pattern of the plurality of markers, the pattern indicator marker having different characteristics than the other markers;
processing, using an image processor, the one or more images of the plurality of markers to identify the predefined pattern of the plurality of markers based on the pattern indicator marker;
determining guidance information for the rotorcraft relative to the off-board target based on the identified predefined pattern of the plurality of markers, an orientation of the plurality of markers and a relative spacing of the plurality of markers; and
providing the determined guidance information to a display device within a field of view of an operator of the rotorcraft.

2. The method according to claim 1, wherein the characteristics of the plurality of markers comprises one of a wireless signal, a color, a frequency of a wireless signal, a pulse, and a shape.

3. The method according to claim 1, wherein the plurality of markers comprises beacons that propagate wireless signals, the wireless signals comprising one or more of ultraviolet light, visible light, infrared light, and short wave infrared light.

4. The method according to claim 1, wherein at least one marker of the plurality of markers comprises a beacon array, the beacon array comprising a plurality of beacons in a single unit for propagating information describing one or more of the predefined pattern of the plurality of markers, distances between the plurality of markers, and a total number of the plurality of markers.

5. The method according to claim 1, wherein the guidance information comprises one or more of range and directional pose information related to the position of the off-board target relative to the rotorcraft based on relative spacing and orientation of the plurality of markers.

6. The method according to claim 1, wherein the guidance information comprises an output graphic of the plurality of markers overlaid on an image of the off-board target on the display.

7. The method according to claim 1, further comprising providing the guidance information to the operator of the rotorcraft as audio information.

8. The method according to claim 1, wherein the plurality of markers comprises at least three markers arranged in the predefined pattern.

9. The method according to claim 1, wherein the off-board target comprises an item intended to be picked-up by the rotorcraft as a sling load, the plurality of markers being arranged in the predefined pattern on a top surface of the item.

10. The method according to claim 1, wherein the off-board target comprises a landing site for the rotorcraft, the plurality of markers being arranged in the predefined pattern around the landing site.

11. The method according to claim 1, wherein the camera is located on a bottom side of the rotorcraft and comprises a wide-angle lens.

12. A system, comprising:
a rotorcraft;
a camera onboard the rotorcraft;
an image processor for processing images that the camera acquires;
a plurality of markers of an off-board target, the plurality of markers arranged in a predefined pattern; and
a controller, the controller configured to:
acquire one or more images of a plurality of markers of an off-board target using a camera onboard a rotorcraft, the plurality of markers arranged in a predefined pattern, wherein at least one marker of the plurality of markers comprises a pattern indicator marker that is part of the predefined pattern of the plurality of markers and indicates a starting point for identifying the predefined pattern of the plurality of markers, the pattern indicator marker having different characteristics than the other markers;
process, using the image processor, the one or more images of the plurality of markers to identify the predefined pattern of the plurality of markers based on the pattern indicator marker;
determine guidance information for the rotorcraft relative to the off-board target based on the identified predefined pattern of the plurality of markers, an orientation of the plurality of markers and a relative spacing of the plurality of markers; and
provide the determined guidance information to a display device within a field of view of an operator of the rotorcraft.

13. The system according to claim 12, wherein the characteristics of the plurality of markers comprises one of a wireless signal, a color, a frequency of a wireless signal, a pulse, and a shape.

14. The system according to claim 12, wherein the plurality of markers comprises beacons that propagate wireless signals, the wireless signals comprising one or more of ultraviolet light, visible light, infrared light, and short wave infrared light.

15. The system according to claim 12, wherein at least one marker of the plurality of markers comprises a beacon array, the beacon array comprising a plurality of beacons in a single unit for propagating information describing one or more of the predefined pattern of the plurality of markers, distances between the plurality of markers, and a total number of the plurality of markers.

16. The system according to claim 12, wherein the guidance information comprises one or more of range and directional pose information related to the position of the off-board target relative to the rotorcraft based on relative spacing and orientation of the plurality of markers.

17. The system according to claim 12, wherein the guidance information comprises an output graphic of the plurality of markers overlaid on an image of the off-board target on the display.

18. The system according to claim 12, wherein the plurality of markers comprises at least three markers arranged in the predefined pattern.

19. An apparatus, comprising:
an image capturing module configured to acquire one or more images of a plurality of markers of an off-board target using a camera onboard a rotorcraft, the plurality of markers arranged in a predefined pattern, wherein at least one marker of the plurality of markers comprises a pattern indicator marker that is part of the predefined pattern of the plurality of markers and indicates a starting point for identifying the predefined pattern of the plurality of markers, the pattern indicator marker having different characteristics than the other markers;
an image processing module configured to process, using an image processor, the one or more images of the plurality of markers to identify the predefined pattern of the plurality of markers based on the pattern indicator marker;
a guidance module configured to determine guidance information for the rotorcraft relative to the off-board target based on the identified predefined pattern of the plurality of markers, an orientation of the plurality of markers and a relative spacing of the plurality of markers; and
a presentation module configured to provide the determined guidance information to a display device in the field of view of an operator of the rotorcraft.

20. The method of claim 1, wherein processing the one or more images to identify the predefined pattern based on the pattern indicator marker comprises identifying the pattern indicator marker, and starting with the pattern indicator marker and moving to the next marker, to determine the predefined pattern.

21. The system of claim 12, wherein the image processor is configured to identify the pattern indicator marker for starting with the pattern indicator marker and moving to the next marker, to determine the predefined pattern.

22. The apparatus of claim 19, wherein the predefined pattern is configured to be identified by identification of the pattern indicator marker, for starting with the pattern indicator marker and moving to the next marker, to determine the predefined pattern.

\* \* \* \* \*